United States Patent [19]

Fredriksson et al.

[11] 4,061,261
[45] Dec. 6, 1977

[54] DEVICE FOR PERFORMING WORKING OPERATIONS ON A WORKPIECE BY DETONATION OF BLASTING CHARGES

[75] Inventors: Rune Östen Walter Fredriksson; Johan Ingvar Johansson, both of Avesta; Erhard Rudolf Boye, Gunnebobruk, all of Sweden

[73] Assignee: Avesta Jernverks Aktiebolag, Avesta, Sweden

[21] Appl. No.: 527,037

[22] Filed: Nov. 25, 1974

[30] Foreign Application Priority Data

Nov. 28, 1973  Sweden ............................... 7316094

[51] Int. Cl.² ............................................ B23K 21/00
[52] U.S. Cl. ......................................... 228/2.5; 89/1 B
[58] Field of Search .................. 228/2.5, 107, 108; 89/1 B; 30/DIG. 4

[56] References Cited

U.S. PATENT DOCUMENTS

| 2,454,528 | 11/1948 | Temple .............................. 30/DIG. 4 |
| 2,957,176 | 10/1960 | Henning et al. ................... 89/1 B X |
| 2,966,683 | 1/1961 | Schulz ................................ 89/1 B X |
| 2,972,746 | 2/1961 | Skumawitz ......................... 89/1 B X |
| 2,977,598 | 4/1961 | Broughton ............................. 89/1 B |
| 3,325,075 | 1/1967 | Higuchi et al. ........................ 228/2.5 |
| 3,566,649 | 3/1971 | McSmith ............................ 228/2.5 X |

*Primary Examiner*—Al Lawrence Smith
*Assistant Examiner*—K. J. Ramsey
*Attorney, Agent, or Firm*—Stevens, Davis, Miller & Mosher

[57] ABSTRACT

A hand-operated portable tool to detonate blasting charges on a workpiece, including a tool body; a front unit, supported by the body and accommodating an explosive cartridge, for engagement with the workpiece; and a rear unit, supported by the body, including an igniting mechanism for the cartridge. The front unit is movable into a retracted position, with the rear unit being releasable only in the retracted position of the front unit. The tool body includes a first handle to release the igniting mechanism, a security mechanism to render the igniting mechanism inoperative, and a second handle and trigger to render the security mechanism temporarily inoperative, thereby rendering operative the igniting mechanism.

18 Claims, 10 Drawing Figures

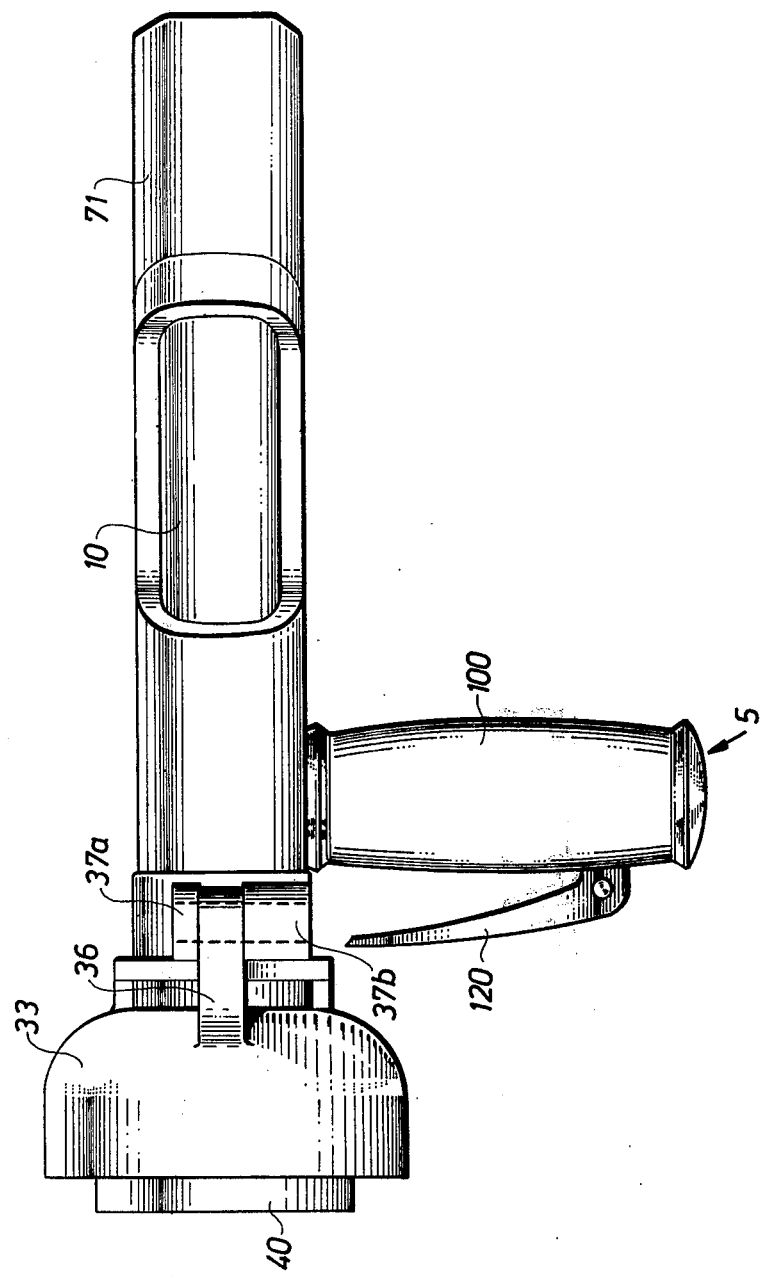

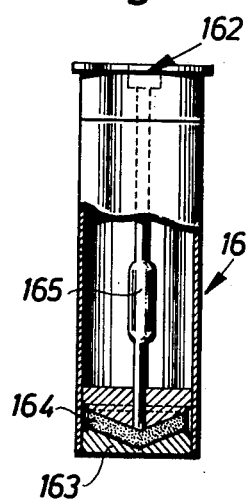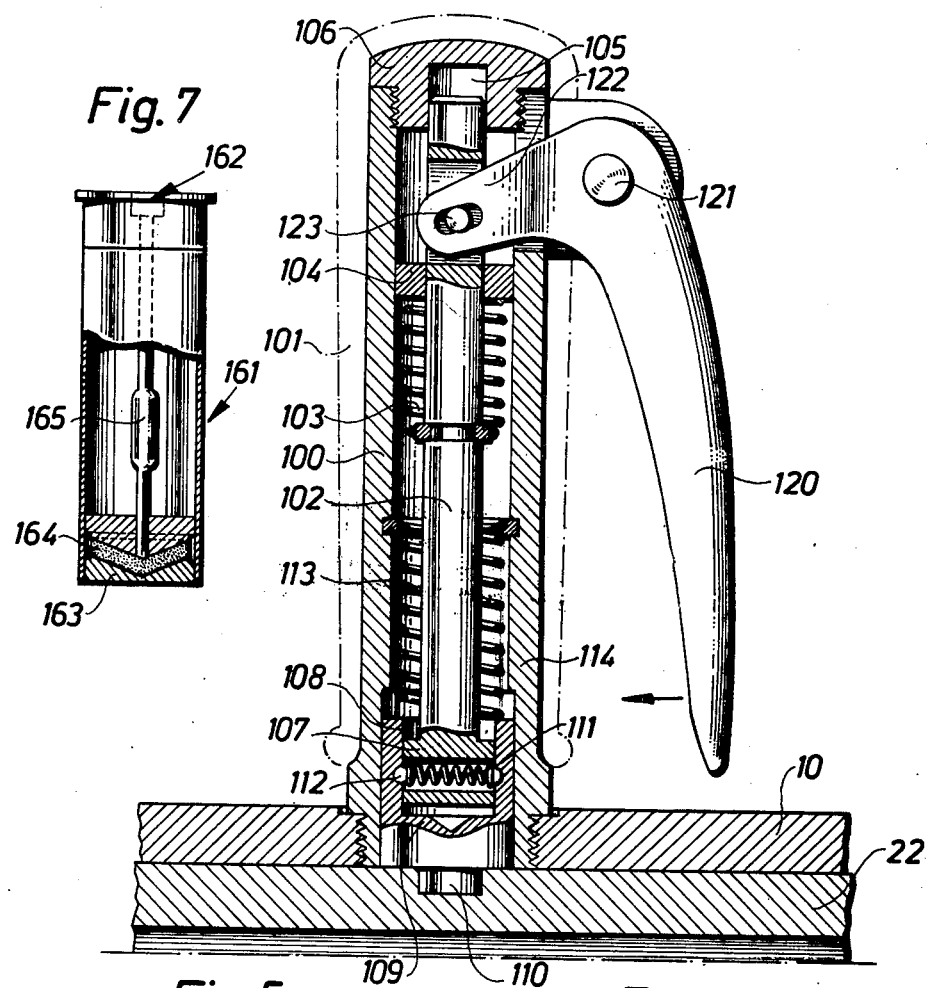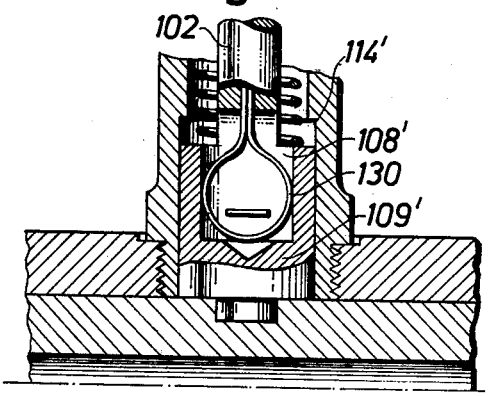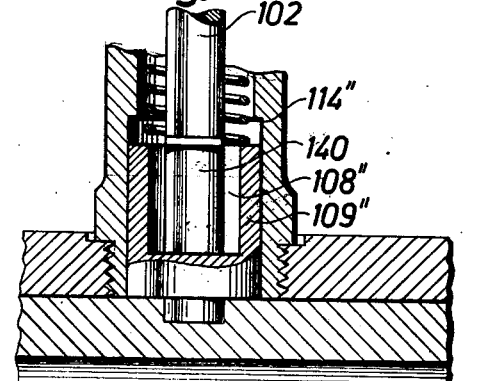

DEVICE FOR PERFORMING WORKING OPERATIONS ON A WORKPIECE BY DETONATION OF BLASTING CHARGES

The present invention relates to a device or tool for performing working operations on a workpiece by detonation of blasting charges. Previously known tools based on the detonation of blasting charges have been developed for a few special purposes, e.g., as bolt guns, nail firing tools, etc.

The object of the present invention is to provide a tool which is specially suited for use in connections where it is desired to obtain a concentrated and powerful pressure action from detonating charges over a very limited surface of an object on which a desired working operation is to be performed. A tool according to the invention is preferably, but not exclusively, intended to be used for spot joining or welding a material, e.g., a material which is difficult to weld in a conventional manner, to a substrate.

It is known that in the manufacture of reaction vessels, storing cisterns, etc. for certain very corrosive fluids only certain selected materials such as titanium, tantalum etc. can be used. These materials are very expensive and for this reason it has been proposed to provide a reaction vessel etc. of thick steel sheet with an internal lining of a relatively thin sheet of said selected material which is very corrosion-resistant. As it has hitherto shown to be practically impossible to weld titanium to a steel substrate, a method has been proposed to utilize titanium pins or plugs which are threaded into the substrate and to connect said pins or plugs with the titanium sheet lining e.g., by welding. This method is very time-consuming and expensive.

It is also known by so-called explosion welding to provide a very strong joint between two materials which cannot easily be joined or bonded together by means of known simple methods.

By means of a tool according to the invention spot explosion welding of a material to a support or substrate can be provided in a simple manner. The tool is relatively light and is provided with means for eliminating various security risks for the personel in connection with the use of the tool and the blasting charges for same.

A device according to the invention for carrying out working operations on a work piece by detonation of blasting charges comprises a first unit, a portion of which being adapted for accommodating a prefabricated explosive cartridge, said first unit being adapted for engagement with said workpiece, and a second unit provided with means for igniting said explosive cartridge, said first and second units being shiftably connected to each other in such manner that one of said units can be moved relatively to the other between a first position in which said explosive cartridge can be fired by said igniting means, and a second position permitting a used cartridge to be easily removed from said first unit and substituted by a new cartridge.

A device according to the invention can suitably be made in the form of a portable, hand operated tool in which said second unit can be shaped in a similar manner as the main portion of a bolt gun or the like. Thus, said second unit can be an elongated body provided with a handle and a mechanism for igniting the explosive cartridge accommodated in said first unit mounted at the front end of said elongated body.

The above-mentioned first unit of the device according to the invention can be provided with an outer, protecting cup-like member preventing noxious residual material of an explosion from being thrown in various directions from the explosion zone.

Furthermore said first unit can comprise a first portion having a bore for accommodating an explosive cartridge and a second portion forming an explosion chamber which is considerably wider than said bore for accommodating the cartridge.

In an embodiment having the above-mentioned gun-like shape, said first and second portions for accommodating the cartridge and for forming an explosion chamber, respectively, can be arranged to be movable along a straight line in the direction of length of the device against the action of a spring-loaded member which is adapted upon movement of said first and second portions to pre-set the firing mechanism of the device so that said mechanism is ready for a firing operation. It is suitable that the presetting of the firing mechanism can be effected only in this manner since this will secure that the firing can only take place when the tool has been pressed so hard against the workpiece that said first unit, including said protective cup-like member, if any, is in correct position in contact with the workpiece at the firing of said cartridge.

The object of the provision of a protective, cup-like member is that said cup-like member shall temporarily accommodate explosion gases and small particles escaping from the explosion zone through passages in the wall of the explosion chamber. The cup-like member can be provided with further passages leading to the outer atmosphere and with internal damping material for decreasing the outgoing sound energy generated at the detonation.

According to a further aspect of the invention the device is formed as a hand-tool provided with a tool body and a first handle and a second handle spaced from said first handle, said handles being directed in different directions in such a manner that the tool can comfortably be held by both hands during a working operation. Said second handle can be provided with a security mechanism which is shiftable between a working and an idle position and adapted in its working position to prevent said firing mechanism from functioning. In such a case a lever or the like can be associated with said second handle for shifting the security mechanism into its idle position. The security mechanism is preferably designed in such a manner that after operation of said lever, said mechanism will automatically return to its working position whereby is prevented that the security mechanism is made permanently idle or non-functioning, for instance by binding up said lever in a presumably non-operative position.

In a device according to the invention explosive cartridges of the hollow-charge type are preferably used.

The invention will hereinafter be more fully described with reference to the accompanying drawings. In the drawings FIG. 1 shows a tool according to one embodiment of the invention as seen from one side and partly in section, the tool being shown in the idle position.

FIG. 3 shows the portable tool as seen from above with a first and a second handle, the latter having a built-in security mechanism against inadvertent firing.

FIG. 4 shows a second handle according to FIG. 3 in a longitudinal section and in a somewhat larger scale than FIG. 3.

FIG. 5 shows in the same section as FIG. 4 an alternative embodiment of a detail of the security mechanism.

FIG. 6 shows in the same section a further alternative of said detail.

FIG. 7 shows an explosive cartridge of the hollow-charge type which can be used in the tool according to the invention.

Figure 1:
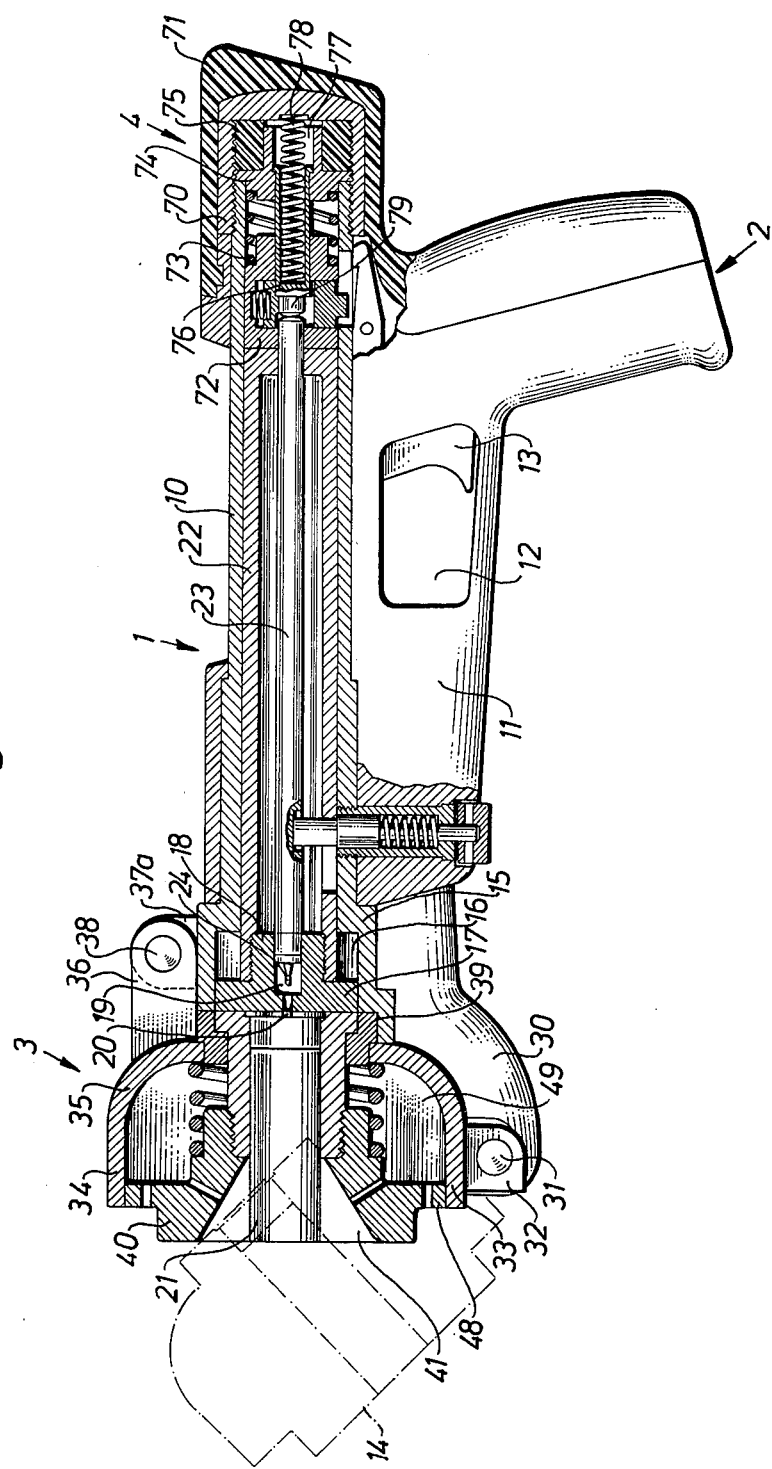

The device according to the drawings is in the form of a portable, hand-operated tool comprising an elongated tool body, generally designated with 1, a handle 2, connected to the tool body, a front unit 3 designed according to the invention for spot explosion joining or welding and a rear unit 4 comprising a firing mechanism.

The tool consists of a mantle comprising inter alia an elongated tube 10 supported by a frame 11 having a passage 12 into which a trigger 13 extends. The tube 10 has an expanded front portion 15 having a cylindrical space 16 in which a thrust bottom 17 is movably arranged. The member 17 has a rearwardly directed extension 18 formed with an internal cylindrical space 19 in which the front end portion of an elongated firing-pin 23 is movably guided. The tip 24 of the firing pin can pass through a small central hole in the thrust bottom 17 situated opposite the detonator 20 of an explosive cartridge 21.

Figure 2:
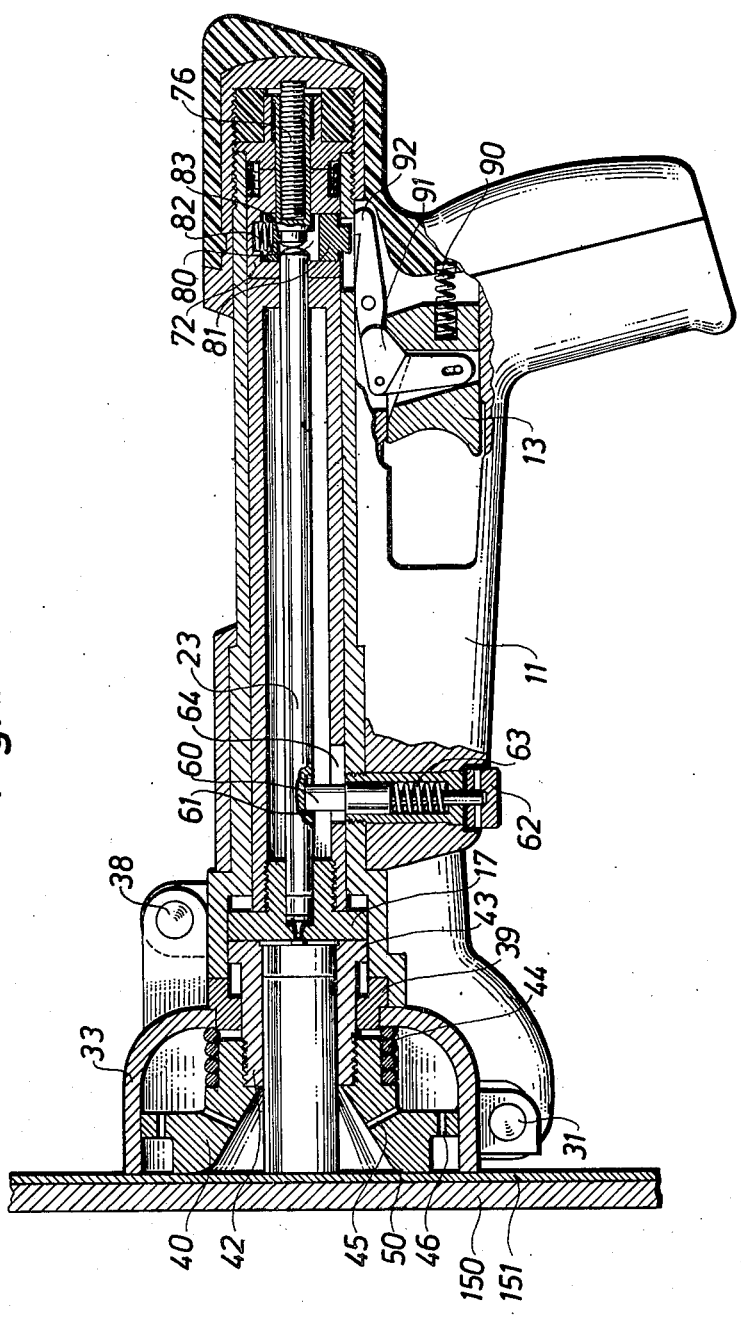
FIG. 2 shows a tool in a similar manner as FIG. 1 but in a position where it is ready for firing for performing an explosion welding.

A cup-like protective member 33 is shiftably mounted to the frame 11 by means of a pin 31 extending through a sloping portion 30 of the frame 11 and projections 32 at the cup-like member. The latter comprises a cylindrical front portion 34 and a curved or arched rear portion 35. A rearwardly directed protrusion 36 connected to the cup 33 extends between two ridges 37a and 37b at the expanded portion 15 of the tube 10. Said protrusion and said ridges are penetrated by a pin 38 which is movable in its direction of length and can be provided with a manually operable knob or the like and be spring-loaded so that it can be drawn out for disengaging the coupling between the protrusion 36 and said ridge. The spring load is intended to move the pin into a pushed-in position for securing the coupling of the protrusion 36 to said ridges. The rear portion 35 of the cup 33 is connected with a ring 39 in which a cartridge accommodating member 42 is movable in the direction of length of the tool. The member 42 has a rear flange 43 having the same outer diameter as the thrust bottom 17 and is at its front portion connected by means of a thread to a housing 40 forming an explosion chamber, a helical pressure spring 44 being inserted between said housing and the rear portion 35 of said cup. The housing 40 has an outer flange portion 48 having a sliding fit in the cylindrical front portion 34 of the cup. Through channels 45 in the housing 40, the explosion chamber communicates with the internal space 49 of the cup and through channel 46 in the flange portion 48 the internal space of the cup communicates with the ambient air outside the explosion chamber. The internal space 49 of the cup accommodates a damping material which is corrosion resistant against the explosive gases, for instance rust-proof steel wool. The explosion chamber has a front surface which is designated by 50, and this surface as well as the front end surface of the cup 33 are shown in FIG. 2 as being in engagement with a sheet 151, for instance a titanium sheet, intended by means of spot explosion welding to be joined to a substrate 150, for instance a steel plate.

In the frame 11 a pin 60 is inserted from below, said pin engaging in a recess 61 in the firing pin 23. The recess 61 has an extension in the direction of length of the firing pin which is only a little greater than the pin 60. The latter is provided with a knob 62 and is loaded by means of a pressure ring 63 acting to hold the pin 60 into engagement with the recess 61. In an alternative embodiment the pin 60 can simply consist of a screw threaded into a corresponding bore in the frame 11 and engaging into the recess 61, since the pin 60 need only be removed from engagement with the recess 61 when the tool shall be disassembled. In order to allow movement of the tube 22 — which shall be described in more detail hereinbelow and which is slidably mounted in the tube 10 and connected to the thrust bottom 17 — relatively to the pin 60, the tube 22 has been formed with an elongated recess 64.

At the rear end of the hand tool the tube 10 is connected by means of a thread connection to an end sleeve 70 which is surrounded by a coating 71 of rubber or a plastics material. Such cover can also be applied to other parts of the tool, for instance the handle 2, the frame 11 etc.

At its rear end the tube 22 is in engagement with a member 72 which is displaceable in the tube 10 and is loaded by a spring 73 inserted between said member and a member 74 mounted in the end sleeve 70, said member 74 resting against a recoil buffer 75. The parts 74 and 75 have a central, axial bore 77 in which a sleeve 76 is displaceable. A pressure spring 78 is inserted within the front end of the sleeve 76 and the sleeve 70. The front end of the sleeve 76 is provided with a pin cooperating with the firing pin 23. The displacement in the forward direction of the sleeve under the action of the spring 78 is limited by a flange at the rear end of the sleeve, when said flange abuts against a shoulder at the member 74.

In a transversal bore 80, from beneath in the member 72, a locking member 81 is inserted, which by means of a pressure spring 82 between the locking member and the bottom of the bore is pressure actuated in a downward direction. The member 81 has a locking shoulder 83 which is arranged to come into locking engagement with the front end of the sleeve 76.

The trigger 13 is spring-loaded by means of a pressure spring 90 and is via a linking mechanism 91 connected to a pressure member 92 which is adapted through an opening in the wall of the tube 10 to move the locking member 81 in an upward direction so that the locking hook 83 is moved from engagement with the front end of the tube 76.

A further handle 100 is attached to the tool body 1; said handle is positioned a certain distance in front of the handle 2 and is directed substantially perpendicularly to the handle 2 as seen in a projection in a plane perpendicular to the direction of length of the tool. The handle 100 contains a security mechanism for locking the sleeve 22 against undesired movements in its direction of length. The locking mechanism comprises a sleeve 109 with a pin 110 extending into a corresponding recess in the tube 22. The sleeve is held in a locking position by means of a pressure spring between the sleeve and the internal wall of the handle, said handle being hollow and accommodating a central rod 102 adapted to be pressed in a direction towards the sleeve 109 by means of a pressure spring 103 inserted between the rod and a member 104 fixed in relation to the handle. The upper end portion of the rod is guided in a recess 105 in an end cap 106 threaded into the handle. At its lower end the rod 102 has an expanded portion 107 which is movable in the internal space 108 of the sleeve 109 and has a transverse bore in which a pressure spring 111 is inserted together with two balls 112 each being inserted between one end of the spring 111 and an opposite ball seat formed in the internal bore of the sleeve 109.

An arm 120 for releasing the locking mechanism is pivotally connected by means of a pin 121 to the handle 100 and has an extension 122 extending into the handle and formed with an oblong through-going hole by means of which and a pin 123 the extension 122 is coupled to the rod 102. By means of this arrangement the rod 102 can be moved upwards when the arm 120 is moved inwardly against the handle. When the rod 102 is moved in such manner the sleeve 109 and locking pin or stud 110 are also moved upwards so that said pin or stud is disengaged from the tube 22. The upward movement of the sleeve 109 continues until the upper edge of the sleeve abuts a shoulder 114 at the internal wall of the handle, whereafter the balls upon continued upward movement of the rod 102, lose their engagement with the corresponding ball seat and are carried up onto the upper internal smooth inner wall of the sleeve 109. The handle can suitably be provided with a rubber or plastics coating 101.

In FIG. 5 a first alternative to the mechanism comprising locking balls 112 in FIG. 4 is shown. Instead of locking balls with an intermediate spring a loop 130 of a strong steel wire or strip is used, which, in the locking position of the sleeve 109' is situated in the internal space 108' of the sleeve while exerting a considerable pressure against the inner wall of the sleeve. Upon upward movement of the rod 102 the sleeve 109' is moved upwards until it abuts the shoulder 114' whereafter the loop is drawn out from the sleeve so that the pressure spring 113 can return the sleeve to its lower position. According to FIG. 6 it is possible as a further alternative to use a permanent magnet 140 inserted between the rod 102 and the bottom of the sleeve 109" said permanent magnet being sufficiently strong upon lifting of the rod 102 to carry with it the sleeve 109" for un-locking. When the sleeve has reached the shoulder 114" the permanent magnet is disengaged or separated from the rod 102 and/or the sleeve 109" and the sleeve is thereupon immediately pressed downwards to its locking position.

FIG. 7 shows a suitable embodiment of an explosive cartridge which can be used in a tool according to the invention. This cartridge comprises a cartridge sleeve 161 with a detonator 162. In the front portion of the cartridge a conical explosive 164 is inserted together with an outer blasting body 163. Between the detonator 162 and the explosive 164 an instantaneous blasting cap 165 is inserted. By means of a cartridge of the type shown it is possible effectively to carry out spot explosion welding of materials which are difficult to join in other conventional ways.

The tool shown in FIGS. 1 - 4 and described above is used and functions as follows.

The cap 33 with the cartridge accommodates member 42 and the explosion chamber 40 is first swung into an open position after releasing the pin 38, said position being indicated at 14 in FIG. 1 by dashed lines. Thereafter an explosion cartridge is inserted in the cartridge sleeve and the swingable unit is returned to the position shown by unbroken lines in FIG. 1 in which position it is locked by returning the pin 38. The tool is thereafter held with both hands of the operator, each hand gripping one of the two handles, whereafter the explosion chamber 40 is pressed against the sheet 151 at the place where a spot explosion welding is to be carried out. Thereafter the arm 120 at the handle 100 is actuated so that the locking stud 110 of the security mechanism is moved out of engagement with the tube 22. The explosion chamber can now be pressed into the cap 33 while moving backwards also the member 42, the thrust bottom 17, the tube 22, and member 72 and the sleeve 76. When this occurs the spring 78 of the firing mechanism is compressed and the slide 81 is moved to a position opposite the pressure member 92 of the triggering mechanism. The firing pin 23 undergoes almost no movement relative to the frame of the apparatus but its tip 24 will, after the movement of the above-mentioned parts, become situated immediately in front of the detonator 20 of the cartridge. After checking that the tool has a correct position in relation to the workpiece the trigger 13 is actuated and the pressure member 92 then moves the slide 81 upwards so that the locking shoulder 82 releases the sleeve 76, the front stud 79 of which hitting the firing pin 23 so that the blasting charge of the cartridge is detonated. The required movement of the firing pin is so small that said movement is permitted by the small difference between the dimensions, in the axial direction of the pin 23, of the stud 60 and the recess 61. At the detonation the desired spot explosion welding is effected and the explosion or combustion gases are immediately pressed into the inner space of the protective cap 33 through the channels 45 and thereafter out to the ambient air through the channels 46. As this occurs an effective damping action takes place in the protective cap, especially if it is filled with a dampening material as mentioned above. At the same time an increase in pressure takes place in the space 49 which results in a recoil dampening effect on the explosion chamber. Correct adjustment of the pressure increase can be effected for instance by suitable dimensioning of the passages 45 and 46. The latter can, if desired, be omitted. If desired, the tool can be connected to means for sucking off nitreous explosion gases from the cup. When the tube 22 returns to the resting position in the tube 10 shown in FIG. 1 the pressure spring 113 will immediately press down the sleeve 109 so that the stud 110 returns to its working position in which it locks the tube 22.

Figure 8:
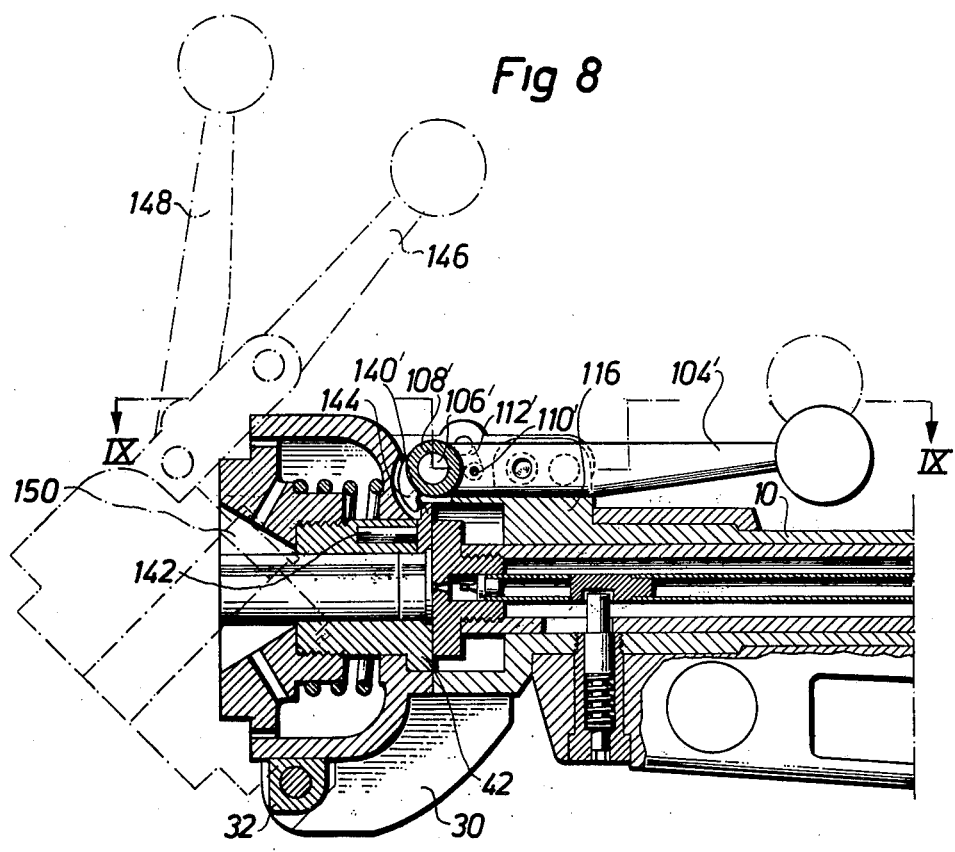
FIGS. 8 and 9 are a longitudinal section view and a plane view, respectively, of the front portion of a tool according to an alternative embodiment, FIG. 9 containing a section corresponding to the arrow markings IX—IX in FIG. 8.
Figure 9:
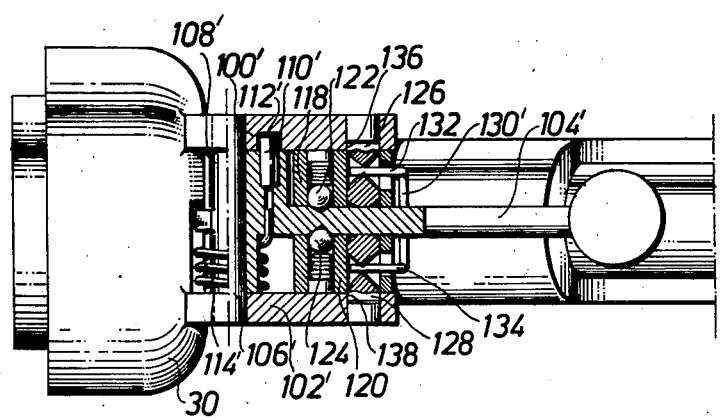

The embodiment shown in FIGS. 8 and 9 has means for initiating the removal of a used cartridge from the cartridge seat but corresponds in other respects substantially with the embodiment according to FIGS. 1 to 5. For the latter reason those parts of the two embodiments which correspond to each other have been provided with identical reference numerals. The protective cup member 33 has two rearwardly directed spaced parallel arms 100' and 102', respectively. Between the arms 100' and 102' a lever 104' is pivotably mounted about an axis 106' by means of a sleeve 108' which is made in one piece with the lever 104' and is transversal to the latter. The axis 106' is fixed to the arms 100' and 102'. The swinging movement of the lever 104' relative to the arms 100' and 102' is limited by means of a device consisting of a pin 110' connected to the lever 104' near the sleeve 108', and engaging a groove 112' at the inside of the arm 100'. The tube 112' is curved coaxially with the axis 106'. A helical spring 114', which surrounds the sleeve 108' and acts between the arm 102' and the lever 104' is effective to bias the lever 104' downwardly relative to the arms 100' and 102' so that the stud 110' is normally held into engagement against the lower end of the groove 112' whereby the relative position between the lever 104' and the arms 100' and 102', respectively, shown in FIG. 8 is obtained.

In the normal position shown in FIG. 8 by means of continuous lines, the lever 104' rests at its lower surface against a shoulder 116 of the tube 10 and between two projections 118 and 120 inwardly of the arms 100' and 102', respectively, in the manner shown in FIG. 9. The projections 118 and 120 are formed with a bore perpendicular to the lever 104', each of which bores accommodating a ball 122 and 124, respectively, which are urged against the corresponding sides of the lever by means of a spring. In the locking position the balls engage a recess in the lever 104'.

The shoulders 118 and 120 comprise further bores each accommodating a pin 126 and 128, respectively, the latter bores being parallel to the bores containing the balls 122 and 124. The pins 126 and 128 are urged against each other by means of a spring yoke 130', the two shanks 132 and 134 of which engaging sidewise in holes in the pins 126 and 128, respectively, each via one opening in the corresponding shoulder leading to the corresponding hole of the pins. As appears from FIG. 9 each of the pins 126 and 128 engages one side of the lever 104' by means of a rounded end portion, the opposite end of the pins engaging in corresponding holes 136 and 138 in the arms 100' and 102', respectively. The pins 126 and 128 serve for locking the arms 100' and 102' relatively to the shoulders 118 and 120 in the shown position.

The cartridge accommodating member 42 is at its rear portion associated with a cartridge rejecting member 140' extending to the bore accommodating the cartridge and being shaped at this place so as to correspond to the rear flanged end of the cartridge 21. The cartridge rejector 140' is movable relatively to the cartridge accommodating member 42 and is guided by means of a pin 142 which is movable in a bore in the cartridge accommodating member.

The sleeve 108' has a front shoulder 144 intended for cooperation with the cartridge rejecting member in the following manner.

When a shot has been made and the tool recharged the lever 104' is sized and lifted. The lever is then released from the ball locking means 122, 124 and the pins 126 and 128 are simultaneously released so that the latter are moved against each other by the spring shanks 132, 134 and act to release the arm 100' and 102', respectively. At the end of this first step of the movement of the lever 104' the pin 110' reaches the upper end of the groove 112'.

At continued movement of the lever 104' the arms 100' and 102' are taken along owing to the coupling consisting of the pin 110' and the groove 112' until the position shown by broken lines 146 has been reached, in which position the projection 32 with its shoulder is stopped by the bottom of the corresponding groove in the downwardly directed portion 3o of the frame 11.

At continued actuation of the lever 104 in an upward direction the lever is turned around the axis 106' against the action of the spring 114' until the position indicated at 148 by broken lines has been reached, and during this movement the shoulder 144 at the end of the lever 104' engages the cartridge rejecting member 140' and moves the latter somewhat rearwardly relatively to the cartridge accommodating member 42, this having as a result that the member 140' moves the cartridge out of the cartridge seat a certain distance until the cartridge has reached the position indicated at 150 in FIG. 8. In this position the cartridge can easily be gripped by hand and removed.

Figure 10:
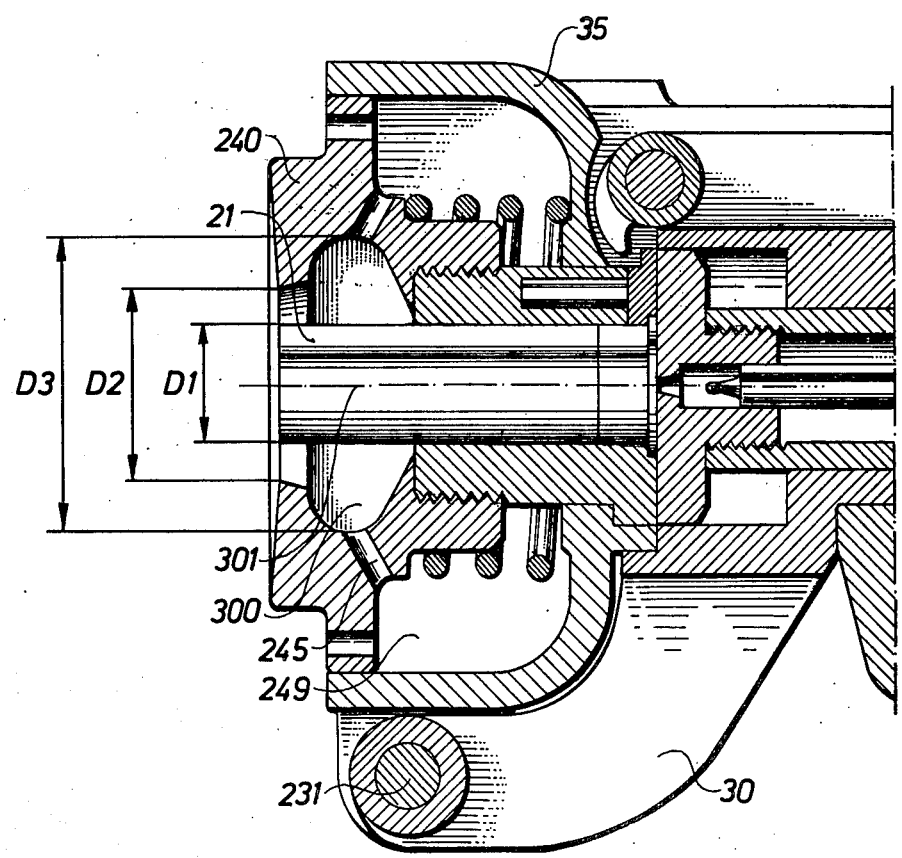
FIG. 10 is a longitudinal section of an alternative embodiment of the front portion of a tool according to the invention, said front portion comprising the unit for accommodating an explosive cartridge.

FIG. 10 shows a preferred embodiment of a unit comprising a cartridge accommodating member, an explosion chamber and a protecting cap, which unit constitutes the front portion of a tool according to the invention. The explosion chamber 300 is formed in the member 240 which corresponds to the member 130 in the embodiment according to FIGS. 1 – 4 with its associated cartridge accommodating member 42. Instead of having a conical shape as in FIGS. 1 – 4 the explosion chamber has a more complicated configuration in FIG. 10. Starting from a mid-section of the cartridge the explosion chamber widens rather abruptly until it reaches a maximum diameter D3 whereafter the chamber narrows to reach a diameter D2 at the front surface of the member 240 constituting the explosion chamber. The diameter D2 is only slightly greater than the diameter D1 of the cartridge and is considerably less than the maximum diameter D3 of the explosion chamber. The diameter D2 can suitably be less than 3 × D1 and is preferably less than about 2 × D1. When the cartridge is detonated the cartridge case is wholly cut off at the border edge between the cartridge accommodating bore and the explosion chamber so that the remaining used cartridge can easily be drawn out when the tool is to be recharged. The explosion gases in the chamber 300 can pass through passages 245 into the space 249 in the cap member 35 in a similar manner as has been described in connection with FIGS. 1 – 4. By restricting the diameter D2 of the opening through which the explosion chamber 300 communicates with the ambient air so that this diameter is only slightly larger than the diameter of the cartridge the performance of the tool can be improved. Thus, the recoil forces acting upon the tool at the detonation is reduced as compared with the corresponding forces when using the tool according to FIGS. 1 – 4, the strength and quality of the spot explosion weld is increased, small metallic and other hard particles formed at the detonation are prevented to a large extent from impinging upon the workpiece since they are collected in the widened explosion chamber 300 and such particles are also prevented from escaping outwardly from between the front end of the tool and the workpiece. And as a further advantage it can be mentioned that spot explosion welding can be performed at placed on a workpiece which are closer to an edge of the workpiece than in the case when a tool according to FIGS. 1 – 4 is used.

As to the choice of materials to be used in the tool according to the invention it can be mentioned that all vital parts are preferably formed of high quality steel.

The invention is not restricted to the embodiments shown and described since they can be changed and modified in various ways within the scope of the invention. In this connection it is to be pointed out again that the invention can be applied not only to tools for spot explosion welding but also to tools for other purposes, for instance for forming a workpiece by explosion action etc. In such case explosion chambers, caps can be used which in certain cases can differ essentially from what has been shown in connection with the embodiments according to the drawings.

Nor is the invention restricted with respect to the dimensions of the tool and its essential parts, but it can be mentioned that the length of the tool when in the form of a hand-operated tool can be between 300 and 500 mm, for instance about 400 mm, and the protecting cap 33 can have a diameter of about 50 to 150 mm, for instance about 100 mm. The unit comprising the cartridge accommodating member and the explosion chamber associated therewith can have an axial length of about 40 to 100 mm, for instance about 60 mm. Thus, the length of said unit can be considerably less than the total length of the tool, suitably not more than about ⅓ and preferably not more than 1/5, for instance about 1/6 of the total length of the tool.

In some instances the protection cap, for instance that shown at 33 in FIGS. 1 - 4, can be omitted and in such case the gas passages 45 and 46 in the explosion chamber member 40 should not be provided. Furthermore, it can be mentioned that the explosion chamber can in some instances have the shape of cylindrical bore having a diameter slightly greater or substantially equal to the bore accommodating the explosive cartridge.

We claim:

1. A hand-operated portable tool for carrying out working operations on a workpiece directly by blasting action produced by detonation of an explosive cartridge, comprising: a tool body; a front unit means, supported by said tool body, for engagement with the workpiece; and rear unit means supported by said tool body; said front unit means including means, movable towards said rear unit means into a retracted position against the action of a resilient means, for accommodating a prefabricated explosive cartridge in a position in which the front end of said cartridge is situated near the front end of said front unit means; said rear unit means including an igniting means for the explosive cartridge, said igniting means being releasable only in the retracted position of said front unit means; and said tool body including a first handle having first manually operable means for releasing said igniting means, a security means having an operative position in which to render said igniting means inoperative; and a second handle disposed a substantial distance forward of said first handle and near said front unit means and having second manually operable means for making said security means temporarily inoperative to render operative said igniting means.

2. A tool according to claim 1 wherein said cartridge accommodating means is surrounded by a protecting cap for collecting explosion gases and particles, created at the detonation of the cartridge.

3. A tool according to claim 2 wherein said front unit means is shiftable against the action of said resilient means from a first postion in which the front end of the explosive cartridge is situated in front of the front end of said protecting cap to a second position in which the front end of the explosive cartridge is situated approximately in flush with the front end of said protecting cap.

4. A tool according to claim 2 wherein said front unit means is provided with means for shifting said front unit means into a position for recharging to draw out a used cartridge from said cartridge accommodating means at least to such an extent that the cartridge can thereafter be easily removed manually.

5. A tool according to claim 1 wherein said front unit means is supported by said tool body by means enabling said front unit means to be shiftable between a first position for detonation of a blasting charge and a second position for comfortable recharging of said front unit means.

6. A tool according to claim 5 wherein said front unit means is swingably connected to said tool body.

7. A tool according to claim 5 wherein said front unit means is lockable to said tool body in said first position by said enabling means.

8. A tool according to claim 1 wherein said cartridge accommodating means is displaceable in said front unit means in the direction of length of the tool.

9. A tool according to claim 1 wherein said igniting means includes an elongated firing pin to detonate a blasting charge in said front unit means.

10. A tool according to claim 1 wherein said front unit means includes means to tension said igniting means while said front unit means is moving to its retracted position so that said igniting means is ready for firing.

11. A tool according to claim 10 wherein said front unit means is coupled to said rear unit means by an elongated tube means which is displaceable in said tool body.

12. A tool according to claim 1 wherein said security means is provided in said second handle, said second manually operable means shifting said security means from its operative position into its inoperative position.

13. A tool according to claim 12 wherein said security means includes means to automatically return said security means to its operative position after operation of said second manually operable means.

14. A tool according to claim 1 wherein said security means includes means to prevent said front unit means from moving into its retracted position in the operative position of said security means.

15. A tool according to claim 1 wherein said cartridge accommodating means is accommodated in a tool part having an explosion chamber surrounding the front portion of the explosive cartridge.

16. A tool according to claim 15 wherein said explosion chamber has an outlet opening in a wall facing the workpiece, the cross sectional area of said outlet opening being equal to or only slightly larger than the cross sectional area of the cartridge as viewed in a plane perpendicular to the direction of length of the tool.

17. A hand-operated portable tool for carrying out working operations on a workpiece directly by blasting action produced by detonation of an explosive cartridge, comprising: an elongated tool body; a front unit means for engagement with the workpiece, including means for accommodating a prefabricated explosive cartridge in a position in which the front end of said cartridge is situated near the front end of said front unit means, said front unit means being swingably connected to said tool body about an axis situated in a plane substantially perpendicular to the direction of length of said tool body and being swingable between a first position in which the tool is ready for firing and a second position in which an explosive cartridge can easily be inserted into said cartridge accommodating means; an igniting means for the explosive cartridge; a first handle having first manually operale means for releasing said igniting means; a security means having an operative position to render said ignition means inoperative; and a second handle disposed a substantial distance forward of said first handle and near said front means having second manually operable means for making said security means temporarily inoperative to render said ignition means operative.

18. A tool according to claim 17 wherein said front unit means is provided with means for shifting said front unit means into a position for recharging to draw out a used cartridge from said cartridge accommodating means at least to such an extent that the cartridge can thereafter be easily removed manually.

* * * * *